US006727338B1

(12) United States Patent
Kilgour et al.

(10) Patent No.: US 6,727,338 B1
(45) Date of Patent: Apr. 27, 2004

(54) STAR-BRANCHED SILICONE POLYMERS AS ANTI-MIST ADDITIVES FOR COATING APPLICATIONS

(75) Inventors: John Alfred Kilgour, Clifton Park, NY (US); Edwin C. Cua, Clifton Park, NY (US); John A. Cummings, Gansevoort, NY (US)

(73) Assignee: General Electric Company, Pittsfield, MA (US)

( * ) Notice: Subject to any disclaimer, the term of this patent is extended or adjusted under 35 U.S.C. 154(b) by 51 days.

(21) Appl. No.: 10/295,586

(22) Filed: Nov. 15, 2002

(51) Int. Cl.[7] .............................................. C08G 77/12

(52) U.S. Cl. ............................ 528/25; 528/15; 528/31; 528/32; 525/478; 525/479; 525/446

(58) Field of Search ............................ 528/15, 25, 31, 528/32; 525/478, 479

(56) References Cited

U.S. PATENT DOCUMENTS

| | | | | |
|---|---|---|---|---|
| 2,676,182 A | | 4/1954 | Daudt et al. | 260/448.2 |
| 3,159,601 A | | 12/1964 | Ashby | 260/46.5 |
| 3,159,662 A | | 12/1964 | Ashby | 260/448.2 |
| 3,220,972 A | | 11/1965 | Lamoreaux | 260/46.5 |
| 3,715,334 A | | 2/1973 | Karstedt | 260/46.5 |
| 3,775,452 A | | 11/1973 | Karstedt | 260/429 |
| 3,814,730 A | | 6/1974 | Karstedt | 260/46.5 |
| 5,399,614 A | | 3/1995 | Lin et al. | 524/588 |
| 5,625,023 A | | 4/1997 | Chung et al. | 528/29 |
| 5,698,655 A | | 12/1997 | Chung et al. | 528/29 |
| 5,817,729 A | | 10/1998 | Wengrovius et al. | 528/10 |
| 5,994,454 A | | 11/1999 | Chung et al. | 524/731 |
| 6,388,005 B1 | * | 5/2002 | Morita et al. | 524/837 |
| 6,451,909 B1 | * | 9/2002 | Herzig et al. | 524/837 |

FOREIGN PATENT DOCUMENTS

| | | | |
|---|---|---|---|
| WO | WO 01/98418 A2 | 6/2001 | C09D/183/00 |
| WO | WO 01/98420 A2 | 6/2001 | |
| WO | WO 02/18506 A1 | 7/2001 | C09D/183/04 |

* cited by examiner

*Primary Examiner*—Robert Dawson
*Assistant Examiner*—Marc S. Zimmer
(74) *Attorney, Agent, or Firm*—Kenneth S. Wheelock

(57) ABSTRACT

A hydrido-silicone is incompletely reacted with (preferably) a long chain olefin under hydrosilylation conditions to produce a partially substituted hydrido-silicone that is further reacted under hydrosilylation conditions with a vinyl containing MQ resin to partially consume the remaining hydride species which is then reacted under hydrosilylation conditions to consume the remaining hydride species with a long chain diolefin to produce a composition that is useful as an anti-mist agent in the coating of flexible supports.

29 Claims, No Drawings

STAR-BRANCHED SILICONE POLYMERS AS ANTI-MIST ADDITIVES FOR COATING APPLICATIONS

FIELD OF USE

The present invention relates to coating flexible materials or supports such as sheets of paper or other polymeric material, either woven or non-woven, with a silicone composition. The present invention also relates to the coating of flexible materials or supports with liquid compositions comprising one or more cross-linkable polyorganosiloxanes wherein such polyorganosiloxanes are cross-linkable by an addition reaction, a condensation reaction, a cationic reaction, or a free-radical reaction. The present invention also relates to star branched polyorganosiloxanes (silicone polymers) that reduce misting during the application of the silicone composition (polyorganosiloxane) to the flexible material or support. The flexible support may be paper, cardboard, plastic film, metal film and the like. Some exemplary applications are paper for foodstuffs, adhesive labels, adhesive tapes, seals and the like.

BACKGROUND OF THE INVENTION

The coating of flexible supports with liquid silicones is typically carried out on coating devices that operate continuously at very high speed. These devices usually comprise coating heads composed of several rolls, including in particular a pressure roll and a coating roll that are continuously fed with a silicone composition that may or may not be cross-linkable, by means of a series of rolls that are placed next to one another. A strip of flexible support of the desired material to be coated is fed at high speed between the pressure roll and the coating roll to be coated on at least one of its surfaces. When it is intended to cross link the silicone coating, apparatus to implement a cross linking reaction are positioned downstream of the coating head. The apparatus that implements cross-linking may be for example an oven or an emitter of radiation, e.g. ultraviolet (UV) radiation or an emitter of a beam of electrons (EB).

High speed coating of flexible supports with silicones has been associated with problems associated with the transfer of the silicone liquid (or fluid) from the coating roll to the flexible support, which moves forward through the coating apparatus. One of the particular problems associated with transfer of the silicone liquid from the coating roll to the flexible support is the appearance of a fog, mist or aerosol in the immediate vicinity of the coating head and particularly close to the points of contact between the coating roll and the flexible support being coated. Typically, the density of this fog, mist or aerosol increases with an increase in the forward speed of the flexible support being coated by the apparatus.

The first effect of this transfer problem is to reduce the amount of silicone liquid actually transferred to the flexible support. A second effect is for the droplets comprising the fog, mist or aerosol to condense onto the newly coated flexible support downstream of the coating rolls creating an orange peel effect. This orange peel effect, or coating non-uniformity, creates problems with coverage, the mechanical properties of the coating, e.g. ruboff, and adhesion resistance.

An additional problem caused by non-uniformity in the coating is related to industrial hygiene and the safety of people operating the coating equipment who are working in the vicinity of the coating equipment.

SUMMARY OF THE INVENTION

The present invention provides for a composition comprising the hydrosilylation reaction product of:
a) Compound A
b) and an amount α of $CH_2=CHR'CH=CH_2$ where R' is a divalent radical selected from the group consisting of halogens, hydrogen, C1 to C60 divalent hydrocarbon radicals, C1 to C60 divalent polyester radicals, C1 to C60 divalent nitrile radicals, C1 to C60 divalent alkyl halide radicals and C1 to C60 divalent polyether radicals and α>b+d+f−g−h−i where Compound A is the hydrosilylation reaction product of:
c) $M'_g M_a M^H_{b-g} D_c D'_h D^H_{d-h} T_e T'_i T^H_{f-i}$ and
d) $(M_j M^{Vi}_k D_l D^{Vi}_m T_n T^{Vi}_o)_p Q)_q$,
where the subscripts a, b, c, d, e, f, g, h, i, j, k, l, m, n, o, p, are zero or positive and q is non-zero and positive, with k+m+o<b+d+f−g−h−i , p ranges from 0.4 to 4.0, q ranges from 1 to 200 where the ratio between $M'_g M_a M^H_{b-g} D_c D'_h D^H_{d-h} T_e T'_i T^H_{f-i}$ and $(M_j M^{Vi}_k D_l D^{Vi}_m T_n T^{Vi}_o)_p Q)_q$ as defined by (b+d+f−g−h−i)/(((k+m+o)p)q) ranges from 50.0 to 0.01, preferably from 10.0 to 0.10; more preferably from 5.0 to 0.20 and most preferably from 4.0 to 0.25 and all sub-ranges there between; and where the compound:

$M'_g M_a M^H_{b-g} D_c D'_h D^H_{d-h} T_e T'_i T^H_{f-i}$ is the hydrosilylation reaction product of e) $M_a M^H_b D_c D^H_d T_e T^H_f$ and
f) an amount β of $CH_2=CHR^1$ where β+1≤b+d+f and b+d+f−g−h−i >0 with 1.5≤b+d+f≤100; 2≤a+b≤12; 0≤c+d≤1000; 0≤e+f≤10 and $R^1$ is a monovalent radical selected from the group consisting of halogens, hydrogen, C1 to C60 monovalent hydrocarbon radicals, C1 to C60 monovalent polyester radicals, $D'=(CH_2CHR^1)R^9SiO_{2/2}$; and
$T'=(CH_2CHR^1)SiO_{3/2}$ with each $R^2$, $R^3$, $R^4$, $R^5$, $R^6$, $R^7$, $R^8$, $R^9$ and $R^{11}$ independently selected from the group of C1 to C60 monovalent hydrocarbon radicals where the subscripts a, b, c, d, e, f, g, h, and i are zero or positive subject to the limitations that b+d+f−g−h−i>0.

The present invention further provides for a composition to reduce misting during the coating of flexible supports comprising the hydrosilylation reaction product of:
a) $M'_g M_a M^H_{b-g} D_c D'_h D^H_{d-h} T_e T'_i T^H_{f-i}$ and
b) $(M_j M^{Vi}_k D_l D^{Vi}_m T_n T^{Vi}_o)_p Q)_q$ where the subscripts j, k, l, m, n, o and p are zero or positive subject to the limitation that k+m+o>0, k+m+o<b+d+f−g−h−i, p ranges from 0.4 to 4.0, q is non-zero and positive subject to the limitation that:

(b+d+f−g−h−i)/(((k+m+o)p)q) ranges from 4.59 to 0.25, where
$M^{Vi}=R^{Vi}R^5R^6SiO_{1/2}$;
$D^{Vi}=R^{Vi}R^{10}SiO_{2/2}$;
$T^{Vi}=R^{Vi}SiO_{3/2}$;
$Q=SiO_{4/2}$; where
$R^{10}$ is independently selected from the group of C1 to C60 monovalent hydrocarbon radicals and each $R^{Vi}$ is independently selected from the group of C2 to C60 monovalent alkenyl hydrocarbon radicals.

DETAILED DESCRIPTION OF THE INVENTION

The star branched siloxane compounds of the present invention are made as the reaction product of:

Compound $A+\alpha CH_2=CHR'CH=CH_2$ where $R'$ is a divalent radical selected from the group consisting of halogens, hydrogen, a to C60 divalent hydrocarbon radicals, C1 to C60 divalent polyester radicals, C1 to C60 divalent nitrile radicals, C1 to C60 divalent alkyl halide radicals and C1 to C60 divalent polyether radicals and mixtures thereof and $\alpha > b+d+f-g-h-i$ where Compound A is the reaction product of:

$$M'_g M_a M^H_{b-g} D_c D'_h D^H_{d-h} T_e T'_i T^H_{f-i} \quad \text{and}$$
$$(M_j M^{Vi}_k D_l D^{Vi}_m T_n T^{Vi}_o)_p Q)_q,$$

in the presence of a noble metal hydrosilylation catalyst where the subscripts a, b, c d, e, f, g, h, i, j, k, l, m, n, o, p, are zero or positive and q is non-zero and positive, for mixtures of compounds the average values of each of the subscripts will most likely be non-integral, for specific compounds the subscripts will be integral, with $k+m+o<b+d+f-g-h-i$, p ranges from 0.4 to 4.0, preferably 0.5 to 3.0, more preferably 0.5 to 2.5 and most preferably 0.5 to 1.5 and all sub-ranges there between and q ranges from 1 to 200, preferably 1 to 100, more preferably 1 to 75 and most preferably 1 to 50 and all sub-ranges there between where the ratio between the hydride containing precursor and the vinyl containing precursor is defined by the following mathematical relationship between the stoichiometric subscripts of the precursors, $(b+d+f-g-h-i)/(((k+m+o)p)q)$ ranges from 50.0 to 0.01, preferably from 10.0 to 0.10; more preferably from 5.0 to 0.20 and most preferably from 4.0 to 0.25 and all sub-ranges there between and specifically including 3.5 to 0.25; 3.0 to 0.25; 2.5 to 0.25 and 2.0 to 0.25 (where these relationships create a stoichiometric excess of the total hydride available for reaction in the hydride compound, $M'_g M_a M^H_{b-g} D_c D'_h D^H_{d-h} T_e T'_i T^H_{f-i}$, to the total vinyl available for reaction in the MQ resin, $(M_j M^{Vi}_k D_l D^{Vi}_m T_n T^{Vi}_o)_p Q)_q$); and where the compound:

$$M'_g M_a M^H_{b-g} D_c D'_h D^H_{d-h} T_e T'_i T^H_{f-i},$$

may be obtained by the following reaction $$M_a M^H_b D_c D^H_d T_e T^H_f + \beta CH_2 = CHR^1 \rightarrow M'_g M_a M^H_{b-g} D_c D'_h D^H_{d-h} T_e T'_i T^H_{f-i}$$

where $\beta+1 \leq b+d+f$ and $b+d+f-g-h-i > 0$ (these mathematical limitations on the subscripts and the stoichiometric coefficient beta are to insure that the hydride, $M_a M^H_b D_c D^H_d T_e T^H_f$, is in stoichiometric excess as regards the molar quantity of silicon bonded hydrogen available for reaction, relative to the molar quantity of olefin, $CH_2=CHR^1$) with $1.5 \leq b+d+f \leq 100$; $2 \leq a+b \leq 12$; $0 \leq c+d \leq 1000$; $0 \leq e+f \leq 10$ and $R^1$ is a monovalent radical selected from the group consisting of halogens, hydrogen, C1 to C60 monovalent hydrocarbon radicals, C1 to C60 monovalent polyester radicals, C1 to C60 monovalent nitrile radicals, C1 to C60 monovalent alkyl halide radicals, C1 to C60 monovalent polyether radicals and mixtures thereof; with $M=R^2R^3R^4SiO_{1/2}$;

$M^H=HR^5R^6SiO_{1/2}$;

$M^{Vi}=R^{Vi}R^5R^6SiO_{1/2}$;

$D=R^7R^8SiO_{2/2}$;

$D^H=HR^9SiO_{2/2}$;

$D^V=R^{Vi}R^{10}SiO_{2/2}$;

$T=R^{11}SiO_{3/2}$;

$T^H=HSiO_{3/2}$;

$T^{Vi}=R^{Vi}SiO_{3/2}$;

$Q=SiO_{4/2}$;

$M'=(CH_2CHR^1)R^5R^6SiO_{1/2}$;

$D'=(CH_2CHR^1)R^9SiO_{2/2}$; and $T'=(CH_2CHR^1)SiO_{3/2}$ with each $R^2$, $R^3$, $R^4$, $R^5$, $R^6$, $R^7$, $R^8$, $R^9$, $R^{10}$, and $R^{11}$ independently selected from the group of C1 to C60 monovalent hydrocarbon radicals and each $R^{Vi}$ independently selected from the group of C2 to C60 monovalent alkenyl hydrocarbon radicals. Methods for making MQ resins, such as $(M_j M^{Vi}_k D_l D^{Vi}_m T_n T^{Vi}_o)_p Q)_q$, are described in U.S. Pat. Nos. 5,817,729, 5,399,614 and 2,676,182 herewith and hereby specifically incorporated by reference. The phrase C1 to C60 is a carbon number range ranging from 1 to 60 and includes both aliphatic and aromatic radicals, e.g. styryl, this range also includes the following specific sub-ranges, 15 to 60, 30 to 60, 45 to 60, 1 to 15, 1 to 30, 1 to 45, 10 to 30, 10 to 40, 10 to 50 and all sub-ranges therebetween.

The star branched silicone compounds of the present invention are described as the reaction product of the following two compounds:

$$M'_g M_a M^H_{b-g} D_c D'_h D^H_{d-h} T_e T'_i T^H_{f-i} \quad \text{and}$$
$$(M_j M^{Vi}_k D_l D^{Vi}_m T_n T^{Vi}_o)_p Q)_q,$$

because of the multiplicity of hydrosilylation sites available for reaction on each of the component molecules being reacted and the difficulties of reducing such a stochastic chemical reaction to an analytic description.

The compositions of the present invention may be made by neat reactions or by reactions where the reactants are diluted by solvent. Because of the long chain nature of the substituents in these materials, neat reactions, i.e. reactions conducted in the absence of any non-participating solvent, will tend to produce products that conform to the molecular descriptions herein but possessing a more entangled macro-structure. If less entangled macro-structures of these compounds are desired, the preparative reactions should be conducted in suitable solvent media, e.g. cyclic siloxanes, inert hydrocarbon solvents and the like.

Many types of noble metal catalysts for this hydrosilylation reaction are known and such catalysts may be used for the reaction in the present instance. When optical clarity is required the preferred catalysts are catalysts that are soluble in the reaction mixture. By noble metal, Applicants define Ru, Rh, Pd, Os, Ir, and Pt as noble metals and also include Ni in the definition because of its known hydrogenation activity. Preferably the catalyst is a lo platinum compound and the platinum compound can be selected from those having the formula $(PtCl_2Olefin)$ and $H(PtCl_3Olefin)$ as described in U.S. Pat. No. 3,159,601, hereby incorporated by reference. The olefin shown in the previous two formulas can be almost any type of olefin but is preferably an alkenylene having from 2 to 8 carbon atoms, a cycloalkenylene have from 5 to 7 carbon atoms or styrene. Specific olefins utilizable in the above formulas are ethylene, propylene, the various isomers of butylene, octylene, cyclopentene, cyclohexene, cycloheptene, and the like.

A further platinum containing material usable in the compositions of the present invention is the cyclopropane complex of platinum chloride described in U.S. Pat. No. 3,159,662 hereby incorporated by reference.

Further the platinum containing material can be a complex formed from chloroplatinic acid with up to 2 moles per gram of platinum of a member selected from the class consisting of alcohols, ethers, aldehydes and mixtures of the above as described in U.S. Pat. No. 3,220,972 hereby incorporated by reference.

The catalyst preferred for use with liquid injection molding compositions are described in U.S. Pat. Nos. 3,715,334; 3,775,452; and 3,814,730 to Karstedt. Additional background concerning the art may be found at J. L. Spier, "Homogeneous Catalysis of Hydrosilation by Transition Metals", in *Advances in Organometallic Chemistry*, volume 17, pages 407 through 447, F.G.A. Stone and R. West editors, published by the Academic Press (New York, 1979). Persons skilled in the art can easily determine an effective amount of platinum catalyst. Generally, an effective amount for hydrosilylation ranges from about 0.1 to 50 parts per million of the total organopolysiloxane composition and all sub-ranges there between.

Experimental 5.96 grams (0.025 moles) of C16–18 alpha olefin was mixed with 300 grams (0.031 moles) of a silylhydride terminated polydimethylsiloxane and 5 ppm Pt as Karsteadt's catalyst. The reaction was heated and stirred at 95 C. for approximately four hours to allow the olefin to add to the siloxane polymer. Quantitative chemical analysis of residual SiH indicated that the desired amount of hydrogen had been consumed in attaching the olefin to the siloxane.

1.94 grams (0.0023 moles) of an $((M^{Vi})_2Q)_4$ resin was added to the product of the first reaction. 246 grams of Isopar C was added as solvent for the reaction. An additional 5 ppm Pt as Karsteadt's catalyst was added and the reaction stirred and heated to 95 C. for approximately four hours. Quantitative chemical analysis indicated that the vinyl and hydride functional groups had reacted to the desired degree.

0.132 grams (0.0017 moles) of 1,5-hexadiene was diluted in 62 grams of Isopar C and added to the previous reaction mixture. The reaction was heated to 80–85 C. for four hours. The viscosity of the mixture rose to greater than 70,000 cps. indicating a chain extending reaction. 0.039 grams of an alkyl amine was added and the mixture stirred for 1 hour. 308 grams of a vinyl terminated polydimethyl siloxane of about 250 cps was added and the Isopar C was stripped from the solution. The resulting product was used in further testing as an anti misting compound.

A laboratory test instrument consisting of two, rubber coated wheels in contact with each other, and rotating at a controlled, measured speed that simulates coating on a paper coating machine was used to demonstrate the anti misting capability of the compound from example 10. The control solution or material to be tested is fed from a small reservoir to a sponge, which maintains a constant level of material, and then onto one of the wheels. As the wheels spin, mist may be generated from the surface where the loose contact. The mist was measured using a DustTrack Aerosol Monitor. The results shown below in Table I demonstrate that the addition of the anti mist additive from example 10 significantly lowers the mist produced during the coating process.

TABLE I

ANTI MIST RESULTS

| | Control Silicone | Silicone/Anti Mist Additive |
|---|---|---|
| RPM | no AMA | 2% Example 10 |
| 1770 | 1.35* | 1.19 |
| 3300 | 11.6 | 4.73 |
| 4000 | 38.8 | 5.52 |

*Mist values measured by the DustTrack Monitor in mg/m3

The foregoing example is merely illustrative of the invention, serving to illustrate only some of the features of the present invention. The appended claims are intended to claim the invention as broadly as it has been conceived and the examples herein presented are illustrative of selected embodiments from a manifold of all possible embodiments. Accordingly it is Applicants' intention that the appended claims are not to be limited by the choice of examples utilized to illustrate features of the present invention. As used in the claims, the open ended word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims. All United States patents referenced herein are herewith and hereby specifically is incorporated by reference.

What is claimed is:

1. A composition comprising the hydrosilylation reaction product of:
   a) Compound A
   b) and an amount α of $CH_2=CHR'CH=CH_2$
where R' is a divalent radical selected from the group consisting of C1 to C60 divalent hydrocarbon radicals, C1 to C60 divalent polyester radicals, C1 to C60 divalent nitrile radicals, C1 to C60 divalent alkyl halide radicals and C1 to C60 divalent polyether radicals and α>b+d+f–g–h–i where Compound A is the hydrosilylation reaction product of:
   c) $M'_g M_a M^H_{b-g} D_c D'_h D^H_{d-h} T_e T'_i T^H_{f-i}$ and
   d) $(M_j M^{Vi}_k D_l D^{Vi}_m T_n T^{Vi}_o)_p Q)_q$,
where the subscripts a, b, c, d, e, f, g, h, i, j, k, l, m, n, o, p, are zero or positive and q is non-zero and positive, with k+m+o<b+d+f–g–h–i , p ranges from 0.4 to 4.0, q ranges from 1 to 200 where the ratio between $M'_g M_a M^H_{b-g} D_c D'_h D^H_{d-h} T_e T'_i T^H_{f-i}$ and $(M M^{Vi}_k D_l D^{Vi}_m T_n T^{Vi}_o)_p Q)_q$ as defined by (b+d+f–g–h–i)/(((k+m+o)p)q) ranges from 50.0 to 0.01 and where the compound:

$M'_g M_a M^H_{b-g} D_c D'_h D^H_{d-h} T_e T'_i T^H_{f-i}$ is the hydrosilylation reaction product of
   e) $M_a M^H_b D_c D^H_d T_e T^H_f$ and
   f) an amount β of $CH_2=CHR^1$
where β+1≦b+d+f and b+d+f–g–h–i>0 with 1.5≦b+d+f≦100; 2≦a+b≦12; 0≦c+d≦1000; 0≦e+f≦10 and $R^1$ is a monovalent radical selected from the group consisting of halogens, hydrogen, C1 to C60 monovalent hydrocarbon radicals, C1 to C60 monovalent polyester radicals, C1 to C60 monovalent nitrile radicals, C1 to C60 monovalent alkyl halide radicals, C1 to C60 monovalent polyether radicals and mixtures thereof; with $M = R^2 R^3 R^4 SiO_{1/2}$;
$M^H = HR^5 R^6 SiO_{1/2}$;
$M^{Vi} = R^{Vi} R^5 R^6 SiO_{1/2}$;
$D = R^7 R^8 SiO_{2/2}$;
$D^H = HR^9 SiO_{2/2}$;
$D^V = R^{Vi} R^{10} SiO_{2/2}$;
$T = R^{11} SiO_{3/2}$;
$T^H = HSiO_{3/2}$;
$T^{Vi} = R^{Vi} SiO_{3/2}$;
$Q = SiO_{4/2}$;
$M' = (R^1 CH_2 CH_2) R^5 R^6 SiO_{1/2}$ D'=(R$^1$CH$_2$CH$_2$)R$^9$SiO$_{2/2}$ T'=(R$^1$CH$_2$CH$_2$)SiO$_{3/2}$ with each R$^2$, R$^3$, R$^4$, R$^5$, R$^6$, R$^7$, R$^8$, R$^9$, R$^{10}$, and R$^{11}$ independently selected from the group of C1 to C60 monovalent hydrocarbon radicals and each R$^{Vi}$ independently selected from the group of C2 to C60 monovalent alkenyl hydrocarbon radicals.

2. The composition of claim 1 wherein R$^1$ a is selected from the group consisting of C15 to C60 monovalent hydrocarbon radicals, C15 to C60 monovalent polyester radicals, C15 to C60 monovalent nitrile radicals, C15 to C60 monovalent alkyl halide radicals, C15 to C60 monovalent polyether radicals and mixtures thereof.

3. The composition of claim 1 wherein R$^1$ a is selected from the group consisting of C30 to C60 monovalent hydrocarbon radicals, C30 to C60 monovalent polyester radicals, C30 to C60 monovalent nitrile radicals, C30 to C60 monovalent alkyl halide radicals, C30 to C60 monovalent polyether radicals and mixtures thereof.

4. The composition of claim 1 wherein R$^1$ a is selected from the group consisting of C10 to C40 monovalent hydrocarbon radicals, C10 to C40 monovalent polyester radicals, C10 to C40 monovalent nitrile radicals, C10 to C40 monovalent alkyl halide radicals, C10 to C40 monovalent polyether radicals and mixtures thereof.

5. The composition of claim 2 where each R$^2$, R$^3$, R$^4$, R$^5$, R$^6$, R$^7$, R$^8$, R$^9$, R$^{10}$, and R$^{11}$ are methyl.

6. The composition of claim 3 where each R$^2$, R$^3$, R$^4$, R$^5$, R$^6$, R$^7$, R$^8$, R$^9$, R$^{10}$, and R$^{11}$ are methyl.

7. The composition of claim 4 where each R$^2$, R$^3$, R$^4$, R$^5$, R$^6$, R$^7$, R$^8$, R$^9$, R$^{10}$, and R$^{11}$ are methyl.

8. The composition of claim 1 wherein R$^1$ is styryl.

9. The composition of claim 7 where each R$^2$, R$^3$, R$^4$, R$^5$, R$^6$, R$^7$, R$^8$, R$^9$, R$^{10}$, and R$^{11}$ are methyl.

10. The composition of claim 7 where each R$^2$, R$^3$, R$^4$, R$^5$, R$^6$, R$^7$, R$^8$, R$^9$, R$^{10}$, and R$^{11}$ are selected from the group consisting of C30 to C60 monovalent hydrocarbon radicals, C30 to C60 monovalent polyester radicals, C30 to C60 monovalent nitrile radicals, C30 to C60 monovalent alkyl halide radicals, C1 to C60 monovalent polyether radicals and mixtures thereof.

11. A composition to reduce misting during the coating of flexible supports comprising the hydrosilylation reaction product of:
a) Compound A
b) and an amount α of CH$_2$=CHR'CH=CH$_2$ where R' is a divalent radical selected from the group consisting of halogens, hydrogen, C1 to C60 divalent hydrocarbon radicals, C1 to C60 divalent polyester radicals, C1 to C60 divalent nitrile radicals, C1 to C60 divalent alkyl halide radicals, C1 to C60 divalent polyether radicals and mixtures thereof and α>b+d+f-g-h-i where Compound A is the hydrosilylation reaction product of:
c) M'$_g$M$_a$M$^H_{b-g}$D$_c$D'$_h$D$^H_{d-h}$T$_e$T'$_i$T$^H_{f-i}$ and
d) (M$_j$M$^{Vi}_k$D$_l$D$^{Vi}_m$T$_n$T$^{Vi}_o$)$_p$Q)$_q$, where the subscripts a, b, c, d, e, f, g, h, i, j, k, l, m, n, o, p, are zero or positive and q is non-zero and positive, with k+m+o<b+d+f-g-h-i, p ranges from 0.4 to 4.0, q ranges from 1 to 200 where the ratio between M'$_g$M$_a$M$^H_{b-g}$D$_c$D'$_h$D$^H_{d-h}$T$_e$T'$_i$T$^H_{f-i}$ and
(M$_j$M$^{Vi}_k$D$_l$D$^{Vi}_m$T$_n$T$^{Vi}_o$)$_p$Q)$_q$ as defined by (b+d+f-g-h-i)/(((k+m+o)p)q) ranges from 50.0 to 0.01; and where the compound:

M'$_g$M$_a$M$^H_{b-g}$D$_c$D'$_h$D$^H_{d-h}$T$_e$T'$_i$T$^H_{f-i}$ is the hydrosilylation reaction product of:
e) M$_a$M$^H_b$D$_c$D$^H_d$T$_e$T$^H_f$ and f) an amount β of CH$_2$=CHR$^1$ where β+1≦b+d+f and b+d+f-g-h-i>0 with 1.5≦b+d+f≦100; 2≦a+b≦12; 0≦c+d≦1000; 0≦e+f≦10 and R$^1$ is a monovalent radical selected from the group consisting of halogens, hydrogen, C1 to C60 monovalent hydrocarbon radicals, C1 to C60 monovalent polyester radicals, C1 to C60 monovalent nitrile radicals, C1 to C60 monovalent alkyl halide radicals, C1 to C60 monovalent polyether radicals and mixtures thereof; with M=R$^2$R$^3$R$^4$SiO$_{1/2}$;

M$^H$=HR$^5$R$^6$SiO$_{1/2}$;

M$^{Vi}$=R$^{Vi}$R$^5$R$^6$SiO$_{1/2}$;

D=R$^7$R$^8$SiO$_{2/2}$;

D$^H$=HR$^9$SiO$_{2/2}$;

D$^V$=R$^{Vi}$R$^{10}$SiO$_{2/2}$;

T=R$^{11}$SiO$_{3/2}$;

T$^H$=HSiO$_{3/2}$;

T$^{Vi}$=R$^{Vi}$SiO$_{3/2}$;

Q=SiO$_{4/2}$;

M'=(R$^1$CH$_2$CH$_2$)R$^5$R$^6$SiO$_{1/2}$

D'=(R$^1$ $^{CH}_2$CH$_2$)R$^9$SiO$_{2/2}$

T'=(R$^1$ $^{CH}_2$CH$_2$)SiO$_{3/2}$ with each R$^2$, R$^3$, R$^4$, R$^5$, R$^6$, R$^7$, R$^8$, R$^9$, R$^{10}$, and R$^{11}$ independently selected from the group of C1 to C60 monovalent hydrocarbon radicals and each R$^{Vi}$ independently selected from the group of C2 to C60 monovalent alkenyl hydrocarbon radicals.

12. The composition of claim 11 wherein R$^1$ a is selected from the group consisting of C1 to C60 monovalent hydrocarbon radicals, C1 to C60 monovalent polyester radicals, C1 to C60 monovalent nitrile radicals, C1 to C60 monovalent alkyl halide radicals, C1 to C60 monovalent polyether radicals and mixtures thereof.

13. The composition of claim 11 wherein R$^1$ a is selected from the group consisting of C15 to C60 monovalent hydrocarbon radicals, C15 to C60 monovalent polyester radicals, C15 to C60 monovalent nitrile radicals, C15 to C60 monovalent alkyl halide radicals, C1 to C60 monovalent polyether radicals and mixtures thereof.

14. The composition of claim 11 wherein R$^1$ a is selected from the group consisting of C30 to C60 monovalent hydrocarbon radicals, C30 to C60 monovalent polyester radicals, C30 to C60 monovalent nitrile radicals, C30 to C60 monovalent alkyl halide radicals, C1 to C60 monovalent polyether radicals and mixtures thereof.

15. The composition of claim 12 where each R$^2$, R$^3$, R$^4$, R$^5$, R$^6$, R$^7$, R$^8$, R$^9$, R$^{10}$, and R$^{11}$ are methyl.

16. The composition of claim 13 where each R$^2$, R$^3$, R$^4$, R$^5$, R$^6$, R$^7$, R$^8$, R$^9$, R$^{10}$, and R$^{11}$ are methyl.

17. The composition of claim 14 where each R$^2$, R$^3$, R$^4$, R$^5$, R$^6$, R$^7$, R$^8$, R$^9$, R$^{10}$, and R$^{11}$ are methyl.

18. The composition of claim 11 wherein R$^1$ is styryl.

19. The composition of claim 17 where each R$^2$, R$^3$, R$^4$, R$^5$, R$^6$, R$^7$, R$^8$, R$^9$, R$^{10}$, and R$^{11}$ are methyl.

20. The composition of claim 17 where each R$^2$, R$^3$, R$^4$, R$^5$, R$^6$, R$^7$, R$^8$, R$^9$, R$_{10}$, and R$^{11}$ are selected from the group consisting of C30 to C60 monovalent hydrocarbon radicals, C30 to C60 monovalent polyester radicals, C30 to C60 monovalent nitrile radicals, C30 to C60 monovalent alkyl halide radicals, C1 to C60 monovalent polyether radicals and mixtures thereof.

21. A process to reduce misting in the coating of a flexible substrate said process comprising preparing a coating composition for coating said substrate and adding thereto the composition of claim 1.

22. A process to reduce misting in the coating of a flexible substrate said process comprising preparing a coating composition for coating said substrate and adding thereto the composition of claim 2.

23. A process to reduce misting in the coating of a flexible substrate said process comprising preparing a coating composition for coating said substrate and adding thereto the composition of claim 3.

24. A process to reduce misting in the coating of a flexible substrate said process comprising preparing a coating composition for coating said substrate and adding thereto the composition of claim 4.

25. A process to reduce misting in the coating of a flexible substrate said process comprising preparing a coating composition for coating said substrate and adding thereto the composition of claim 5.

26. A process to reduce misting in the coating of a flexible substrate said process comprising preparing a coating composition for coating said substrate and adding thereto the composition of claim 6.

27. A process to reduce misting in the coating of a flexible substrate said process comprising preparing a coating composition for coating said substrate and adding thereto the composition of claim 7.

28. A process to reduce misting in the coating of a flexible substrate said process comprising preparing a coating composition for coating said substrate and adding thereto the composition of claim 8.

29. A process to reduce misting in the coating of a flexible substrate said process comprising preparing a coating composition for coating said substrate and adding thereto the composition of claim 9.

* * * * *